United States Patent
Janson et al.

(10) Patent No.: US 9,944,166 B2
(45) Date of Patent: Apr. 17, 2018

(54) AXLE ASSEMBLY FOR HYBRID ELECTRIC VEHICLE

(71) Applicant: Ford Global Technologies, LLC, Dearborn, MI (US)

(72) Inventors: David Allen Janson, Plymouth, MI (US); Gregory Daniel Goleski, Rochester Hills, MI (US); Christopher Joseph Guarracino, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 223 days.

(21) Appl. No.: 14/921,312

(22) Filed: Oct. 23, 2015

(65) Prior Publication Data
US 2016/0263986 A1 Sep. 15, 2016

Related U.S. Application Data

(60) Provisional application No. 62/130,322, filed on Mar. 9, 2015.

(51) Int. Cl.
| | |
|---|---|
| B60K 6/547 | (2007.10) |
| B60K 6/365 | (2007.10) |
| B60K 6/36 | (2007.10) |
| B60K 6/40 | (2007.10) |
| B60K 6/48 | (2007.10) |
| F16H 3/089 | (2006.01) |
| F16H 3/66 | (2006.01) |

(52) U.S. Cl.
CPC .............. *B60K 6/547* (2013.01); *B60K 6/36* (2013.01); *B60K 6/365* (2013.01); *B60K 6/40* (2013.01); *B60K 6/48* (2013.01); *B60K 2006/4808* (2013.01); *B60K 2006/4841* (2013.01); *B60Y 2200/92* (2013.01); *F16H 3/089* (2013.01); *F16H 3/663* (2013.01); *F16H 2200/0034* (2013.01); *F16H 2200/2005* (2013.01); *F16H 2200/2023* (2013.01); *F16H 2200/2035* (2013.01); *Y02T 10/626* (2013.01); *Y02T 10/6221* (2013.01); *Y10S 903/911* (2013.01); *Y10S 903/919* (2013.01)

(58) Field of Classification Search
CPC . B60K 6/547; B60K 6/36; B60K 6/48; B60K 6/40; B60K 6/365; B60K 2006/4841; B60K 2006/4808; F16H 3/663; F16H 3/089; F16H 2200/2035; F16H 2200/0034; F16H 2200/2023
See application file for complete search history.

(56) References Cited

U.S. PATENT DOCUMENTS

| | | | |
|---|---|---|---|
| 4,658,662 A * | 4/1987 | Rundle | ........... F16H 3/089 74/15.2 |
| 6,827,167 B2 | 12/2004 | Cikanek et al. | |

(Continued)

*Primary Examiner* — David J Hlavka
(74) *Attorney, Agent, or Firm* — David B. Kelley; Brooks Kushman P.C.

(57) ABSTRACT

A hybrid electric vehicle axle includes two separate pinion gears meshing with a single beveled ring gear. One pinion gear conveys power from the internal combustion powertrain while the other pinion conveys power from an electric motor. Power from the electric motor is conditioned by a two-speed gearbox between the electric motor and the second pinion gear. The gearbox may utilize layshaft gearing or planetary gearing such as a Ravgneaux gear set.

19 Claims, 3 Drawing Sheets

(56) References Cited

U.S. PATENT DOCUMENTS

| | | | | |
|---|---|---|---|---|
| 6,976,934 B2* | 12/2005 | Komeda | ............... | B60K 6/48 |
| | | | | 180/65.25 |
| 9,649,927 B2* | 5/2017 | Piazza | ............... | B60K 6/50 |
| 2002/0065163 A1* | 5/2002 | Deichl | ............... | B60K 6/40 |
| | | | | 475/5 |
| 2016/0250916 A1* | 9/2016 | Hirano | ............... | B60K 6/405 |
| | | | | 74/661 |
| 2016/0272058 A1* | 9/2016 | Takami | ............... | B60K 6/40 |

\* cited by examiner

AXLE ASSEMBLY FOR HYBRID ELECTRIC VEHICLE

CROSS-REFERENCE TO RELATED APPLICATIONS

This application claims the benefit of U.S. provisional application Ser. No. 62/130,322 filed Mar. 9, 2015, the disclosure of which is hereby incorporated in its entirety by reference herein.

TECHNICAL FIELD

This disclosure relates to the field of hybrid electric vehicles. More particularly, this disclosure is related to a hybrid electric vehicle having a two-speed gearbox and two pinion gears meshing with a single ring gear.

BACKGROUND

Traditionally, the majority of general purpose road vehicles are powered by liquid fuels such as gasoline or diesel fuel. When the vehicle needs power, an internal combustion engine converts the chemical energy in the fuel into mechanical energy and a powertrain delivers that mechanical energy to vehicle wheels. The vehicles are used over a wide range of vehicle speeds, including both forward and reverse movement. Some types of internal combustion engines, however, are capable of operating efficiently only within a narrow range of speeds. Consequently, the powertrain typically includes a variable speed ratio transmission. Also, a differential assembly may connect the transmission output shaft to the vehicle wheels, providing an additional fixed speed ratio and permitting the left and right wheel to rotate at slightly different speeds as the vehicle turns.

In an effort to reduce the consumption of liquid fuel, some vehicles, called hybrid electric vehicles, utilize electrical energy storage such as a battery. The energy storage capability provides flexibility to perform the conversion of chemical energy when the conversion can be done most efficiently as opposed to always performing the conversion at the moment the power is demanded. Some hybrid electric vehicles, called plug-in hybrid electric vehicles, are also adapted to receive power directly in electrical form.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and shift elements configured to impose specified speed relationships among the rotating elements. A component is called a rotating element if it rotates with respect to the transmission housing in at least some operating conditions. Some speed relationships, called fixed speed relationships, are imposed regardless of the state of any clutches. Other speed relationships, called selective speed relationships, are imposed only when particular clutches are fully engaged.

A group of elements are fixedly coupled to one another if they are constrained to rotate at the same speed and about the same axis in all operating conditions. Elements may be fixedly coupled by spline connections, welding, press fitting, machining from a common solid, or other means. Slight variations in rotational displacement between fixedly coupled elements can occur such as displacement due to spline lash or shaft compliance. In contrast, two elements are selectively coupled by a shift element when the shift element constrains them to rotate at the same speed about the same axis whenever the clutch is fully engaged and they are free to rotate at distinct speeds in at least some other operating condition. Two rotating elements are coupled if they are either fixedly coupled or selectively coupled. Shift elements include actively controlled devices such as hydraulically or electrically actuated clutches and passive devices such as one way clutches. A shift element may couple rotating elements using friction or may create a positive engagement such as interlocking teeth. A shift element that holds a rotating element against rotation by selectively coupling the rotating element to the housing may be called a brake.

Figure 1:
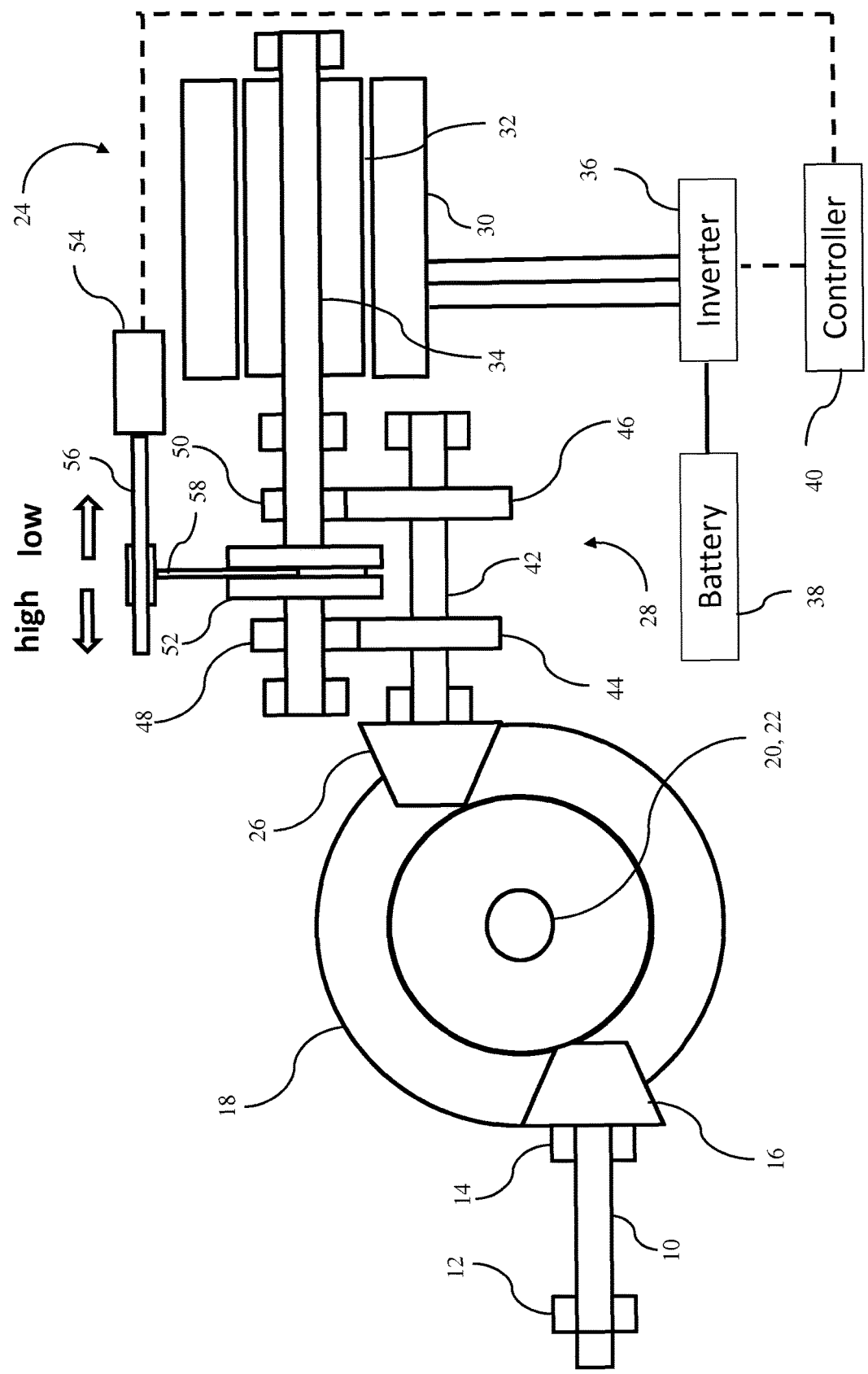
FIG. 1 is a schematic diagram of a first hybrid electric vehicle axle.

FIG. 1 schematically illustrates a two-speed hybrid electric axle utilizing layshaft gearing. Power from an internal combustion engine is delivered, preferably via a multiple speed transmission, to stub shaft 10. Stub shaft 10 is supported for rotation with respect to a housing (not shown) by bearing 12 and 14. Bearings 12 and 14 may be, for example, tapered roller bearings, needle bearings, ball bearings, or bushings. First pinion 16, fixedly coupled to stub shaft 10, meshes with ring gear 18, which is supported for rotation with respect to the housing about an axis perpendicular to the axis of rotation of stub shaft 10. Pinion 16 and ring gear 18 are bevel gears and the gear teeth may be spiral gear teeth. The axis of stub shaft 10 may be offset below the axis of ring gear 18 in which case a hypoid gear profile is used. Ring gear 18 drives left and right axle shafts 20, 22 via a differential (not shown) that permits slight speed differences such as when the vehicle turns a corner.

Power from electric motor 24 is delivered to second pinion 26 via gearbox 28. Pinion 26 meshes with the same gear teeth on ring gear 18 as first pinion 16, but at a different circumferential position. The circumferential location of pinion 26 is based on the physical location of electric motor 24 and gearbox 28 relative to axle shafts 20 and 22, which may vary depending on available packaging space in the vehicle. For a rear wheel drive vehicle, pinion 16 may be in front of the rear axle shafts whereas pinion 26 is behind the rear axle shafts. Pinion gear 26 may be offset above the axis of ring gear 18. If the offsets of pinions 16 and 26 are of equal magnitude, then identical gear profiles may be used which reduces manufacturing cost.

Motor 24 includes a stator 30 fixed to the housing and a rotor 32 fixed to a rotor shaft 34 that is supported for rotation by bearings. The motor may be a direct current (DC) motor or an alternating current (AC) motor such as a synchronous permanent magnet motor or an induction motor. The term motor, as used here, includes reversible electric machines that are capable of both converting electrical power into mechanical power and converting mechanical power into electrical power. In the AC motor illustrated in FIG. 1, the torque exerted on shaft 30 by rotor 32 is related to electrical currents flowing through windings of stator 30. During motoring operation, inverter 36 draws direct current electrical power from a battery 38 and supplies three phases of alternating current to windings of stator 30. Controller 40 sends signals to inverter 36 directing inverter 36 to regulate the voltage, frequency, and phase in each winding such that a desired torque is exerted by rotor 34. During generating operation, controller 40 directs inverter 36 to control the voltage, frequency, and phase such that the torque exerted is opposite the direction of rotation. Electrical power produced is converted to direct current and stored in battery 38.

Gearbox 28 includes a layshaft 42 fixedly coupled to second pinion 26 and to gears 44 and 46. Layshaft 42 is substantially parallel to motor shaft 34. Motor shaft 34 may be physically above layshaft 42 as shown in FIG. 1 or it may be offset below, to the left or right side of the vehicle, or diagonally, as dictated by available packaging space. Gears 48 and 50 are journalled on motor shaft 34 and mesh with gear 44 and 46 respectively. Coupler 52 alternately selectively couples gears 48 and 50 to motor shaft 34. In other words, coupler 52 selectively couples either gear, one at a time, to the shaft. When coupler 52 is moved to the right, it selectively couples gear 50 to motor shaft 34 to establish a low range power flow path from the rotor shaft 34 to ring gear 18 via gear 50, gear 46, shaft 42, and pinion 26. When coupler 52 is moved to the left, it selectively couples gear 48 to motor shaft 34 to establish a high range power flow path from the rotor shaft 34 to ring gear 18 via gear 48, gear 44, shaft 42, and pinion 26. When coupler 52 is in the intermediate position shown in FIG. 1, no power flow path is established. Gear ratios of approximately 3.0:1 for low range and approximately 1.4:1 for high range are recommended. In an alternative embodiment, gears 48 and 50 may be fixedly coupled to shaft 34 and a coupler may selectively couple gears 44 and 46 to shaft 42. Coupler 52 may be a synchronizer of the type generally used in manual transmissions which includes blocker rings that synchronize the speeds of the gear and the shaft before positively engaging. Alternatively, coupler 52 may be a simple dog clutch and synchronization may be performed by active speed control of motor 24.

The position of coupler 52 is controlled via an actuation mechanism that includes an actuator 54, a rail 56, and a fork 58. In response to control signals from controller 40, actuator 54 causes fork 58 to move axially along rail 56. Various types of linear actuators may be utilized. For example, rail 56 may have threads that engages threads in fork 58 and actuator 54 may be a motor that rotates rail 56. Fork 58 engages coupler 52 in a manner that constrains them to have the same axial position but permits coupler 52 to rotate with shaft 34.

Figure 2:
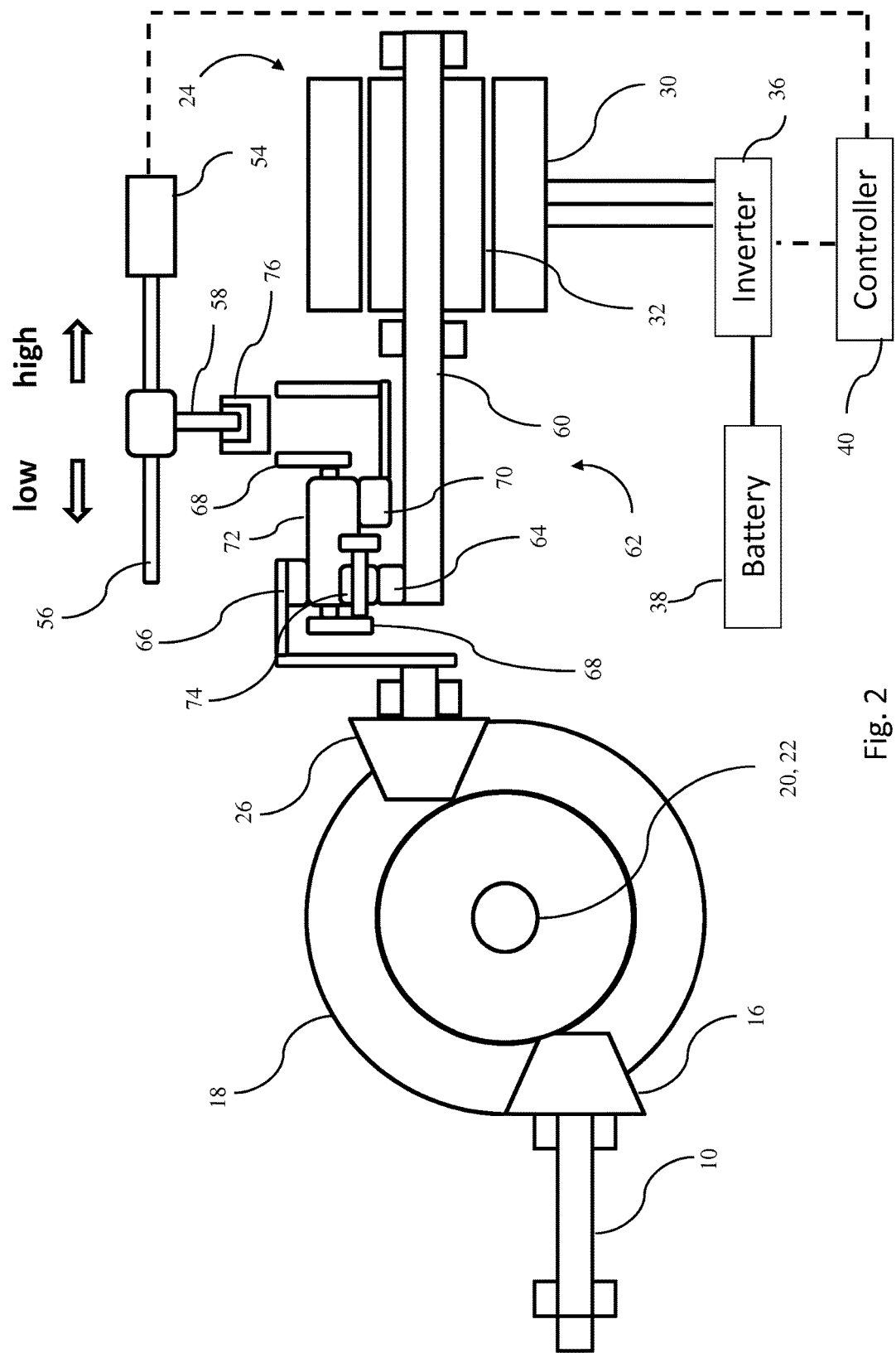
FIG. 2 is a schematic diagram of a second hybrid electric vehicle axle.

FIG. 2 schematically illustrates a two-speed hybrid electric axle utilizing planetary gearing. Elements that are common to both the layshaft embodiment of FIG. 1 and the planetary embodiment of FIG. 2 are labeled with the same reference number. In the planetary embodiment, the rotor is fixedly coupled to a shaft 60 that is co-axial with second pinion gear 26. Gearbox 62 includes a Ravigneaux planetary gear set. First sun gear 64 is fixedly coupled to shaft 60. Ring gear 66 is fixedly coupled to second pinion gear 26. Carrier 68 and second sun gear 70 are both supported for rotation about the axis of shaft 60 and second pinion 26. A set of long planet gears 72 are supported for rotation with respect to carrier 68. Each long planet gear 72 meshes with both second sun gear 70 and ring gear 66. A set of short planet gears 74 are also supported for rotation with respect to carrier 68. Each short planet gear first sun gear 64 and with one of the long planet gears 72. The Ravigneaux gear set creates a fixed linear speed relationship. Specifically, sun gears 64 and 70 always have the most extreme speeds and the speeds of carrier 68 and ring gear 66 have intermediate speeds. The speeds of carrier 68 and ring gear 66 are a weighted average of the speeds of sun gear 64 and sun gear 70 with fixed weighting factors determined by the relative number of gear teeth.

Braking element 76 moves axially with fork 58 but does not rotate. When braking element 76 is moved to the left, it engages carrier 68 to hold carrier 68 against rotation. This establishes a low range power flow path between shaft 60 and ring gear 18. When braking element 76 is moved to the right, it engages second sun gear 70 to hold second sun gear against rotation and establish a high range power flow path. Other arrangements of planetary gearing impose a fixed linear speed relationship among four rotating elements. If the weighting factors are similar to those of the Ravigneaux gear set of FIG. 2, then such a gear set may be substituted for the Ravigneaux gear set of FIG. 2 to achieve comparable results. Four example, two simple planetary gear sets with each carrier fixedly coupled to the opposite ring gear imposes such as relationship with the two sun gears again having the most extreme speeds. As another example, two simple planetary gear sets with the two sun gears fixedly coupled to one another and one carrier fixedly coupled to the opposite ring gear impose a suitable fixed linear speed relationship with the linked sun gear and the unlinked ring gear having the most extreme speeds. To reduce manufacturing cost, especially when the production volume is low, it is advantageous to use planetary gearing that has been developed for other purposes, such as for use in the transmission used to transmit power from the internal combustion engine to stub shaft 10.

Figure 3:
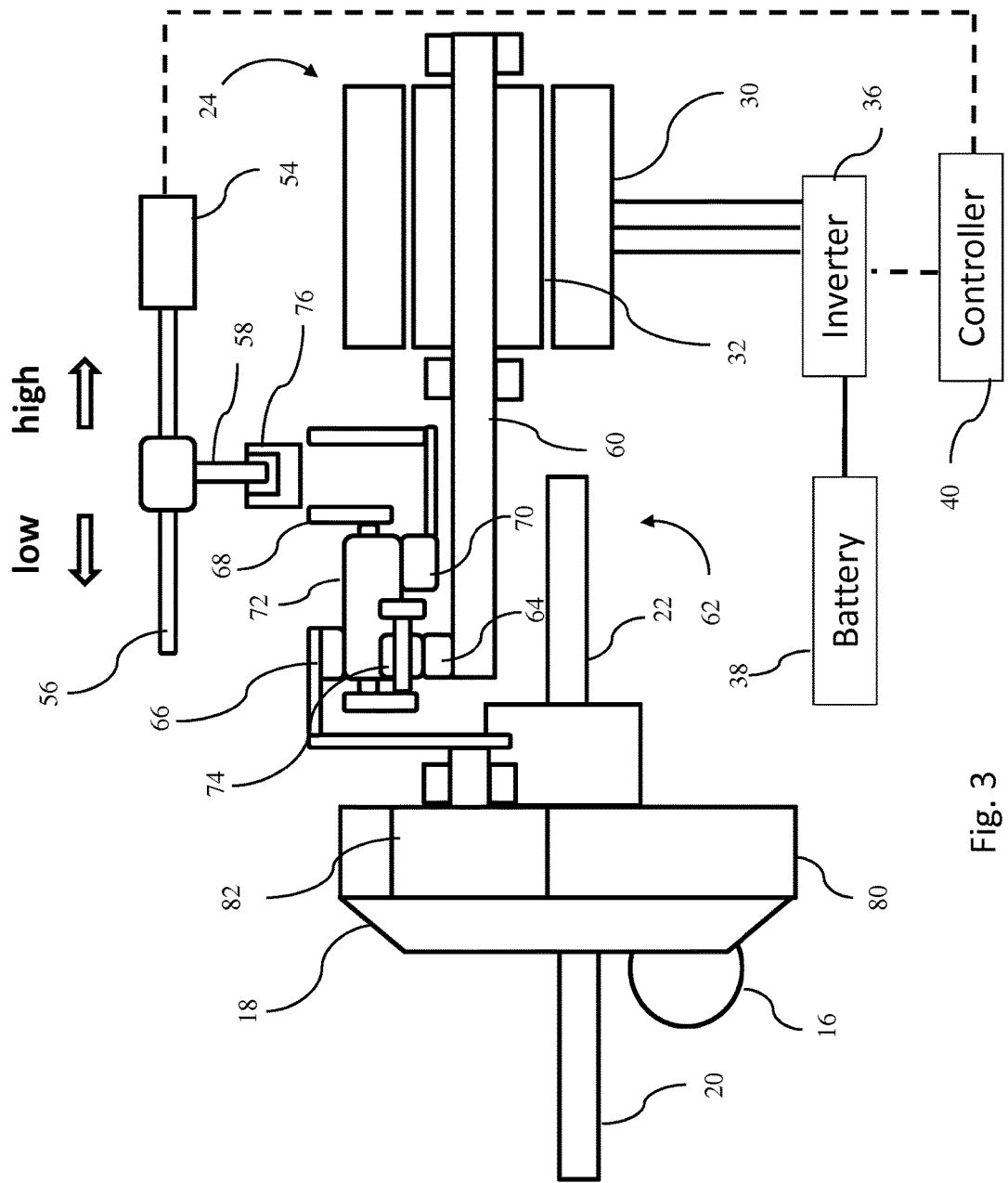
FIG. 3 is a schematic diagram of a third hybrid electric vehicle axle.

FIG. 3 shows an embodiment in which the motor and gearbox have been rotated 90 degrees such they rotate about axes parallel to the ring gear axis. Ring gear 18 includes helical gear teeth 80 in addition to the hypoid gear teeth that mesh with first pinion 16. Pinion 82, which has helical gear teeth, meshes with the helical gear teeth of ring gear 18 and is fixedly coupled to Ravigneaux ring gear 66.

In use, controller 40 directs actuator 54 whether to engage low range, high range, or neutral and directs inverter 36 whether to provide positive or negative motor torque. Controller 40 may be integrated with or in communication with a vehicle systems controller such that it has access to various information about vehicle condition, the condition of other vehicle systems, and about driver intent. For example, controller 40 receives information about vehicle speed, engine torque, brake torque, accelerator pedal position, and brake pedal position. Controller 40 also maintains information about the state of charge of battery 38.

When the vehicle is at low speed, controller 40 directs actuator 54 to engage low range. Selection of low range multiplies the motor torque such that more torque is delivered at ring gear 18 than when in high range for a given motor torque. When the vehicle is at high speed, controller 40 directs actuator 54 to engage high range. Selection of high range reduces the speed of rotor 32 relative to vehicle speed. The threshold speed at which a transition, or shift, occurs may be based on factors such as accelerator pedal position. Also, a shift may be delayed when the motor is being used to provide or withdraw power. To perform a shift, controller first directs inverter 36 to set the motor torque to zero. Then, it directs actuator 54 to disengage the currently selected range. Then, it directs inverter 36 to control the speed of the motor to close to the speed in the destination range. Once the speed is acceptably close to the target speed, controller 40 directs actuator 54 to engage the destination range. The acceptable speed tolerance may depend upon whether coupler 52 or braking element 76 includes a blocker ring to aid in synchronization.

When the accelerator pedal position indicates a driver demand for acceleration, controller 40 may direct inverter 36 to provide torque to boost performance. This action may be coordinated with the engine controller and transmission controller such that the total torque at ring gear 18 complies with a driver demand. During boost, electrical power is withdrawn from battery 38, reducing the state of charge.

When the brake pedal indicates a driver demand for deceleration, controller 40 may direct inverter 36 to provide torque in the opposite direction of rotation. This regenerative braking torque tends to recharge battery 38. Some regenerative braking torque may also be commanded when the driver has not depressed either the accelerator pedal or the brake pedal. The regenerative braking torque may be coordinated with a brake controller such that the total negative wheel torque is properly related to brake pedal pressure or movement. Coordination may also be required to ensure that the relative portion of the brake torque on front wheels and rear wheels is acceptable. Finally, regenerative braking may be coordinated with an anti-lock braking system.

If the state of charge of the battery becomes too low, controller 40 may direct inverter to induce a torque opposite the direction of rotation for the purpose of recharging the battery. This action may be coordinated with an engine controller such that the engine produces additional torque and the total torque delivered to vehicle wheels satisfies the driver demand.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A hybrid electric vehicle axle comprising:
   a beveled ring gear configured to drive left and right axle shafts via a differential;
   a first beveled pinion gear in engagement with the ring gear and adapted to receive power from an internal combustion powertrain; and
   a second beveled pinion gear supported for rotation about an axis perpendicular to a ring gear axis, in engagement with the ring gear, and adapted to receive power from an electric motor.

2. The hybrid electric vehicle axle of claim 1 further comprising:
   a gearbox configured to transmit power from the electric motor to the second beveled pinion gear alternately via two power flow paths, the two power flow paths establishing two distinct speed ratios of an electric motor speed and a second pinion speed.

3. The hybrid electric vehicle axle of claim 2 wherein the gearbox comprises:
   a motor shaft fixedly coupled to a rotor of the electric motor;
   first and second layshaft gears coupled to a motor shaft;
   a layshaft fixedly coupled to the second beveled pinion gear; and
   third and fourth layshaft gears coupled to the layshaft, the third layshaft gear in continuous meshing engagement with the first layshaft gear and the fourth layshaft gear in continuous meshing engagement with the second layshaft gear.

4. The hybrid electric vehicle axle of claim 3 wherein:
   the first and second layshaft gears are alternately selectively coupled to the motor shaft by a coupler; and
   the third and fourth layshaft gears are fixedly coupled to the layshaft.

5. The hybrid electric vehicle axle of claim 4 wherein the coupler is a synchronizer.

6. The hybrid electric vehicle axle of claim 2 wherein the gearbox comprises:
   a motor shaft fixedly coupled to a rotor of the electric motor;
   gearing establishing a fixed linear speed relationship among the motor shaft, the second beveled pinion gear, a first rotating element, and a second rotating element; and
   a braking element configured to alternately selectively hold the first rotating element and the second rotating element against rotation.

7. The hybrid electric vehicle axle of claim 6 wherein the gearing establishing the fixed linear speed relationship comprises:
   a first sun gear fixedly coupled to the motor shaft;
   a ring gear fixedly coupled to the second beveled pinion gear;
   a carrier as the first rotating element;
   a second sun gear as the second rotating element;
   a plurality of long planet gears supported for rotation with respect to the carrier, each long planet gear in continuous meshing engagement with both the ring gear and the second sun gear; and
   a plurality of short planet gears supported for rotation with respect to the carrier, each short planet gear in continuous meshing engagement with both the first sun gear and one of the long planet gears.

8. The hybrid electric vehicle axle of claim 1 wherein:
the first beveled pinion gear is supported for rotation about a first pinion axis offset from a ring gear axis by a first offset distance; and
the ring gear and first beveled pinion gear utilize hypoid gear geometry.

9. The hybrid electric vehicle axle of claim 8 wherein:
the second beveled pinion gear is supported for rotation about a second pinion axis offset from the ring gear axis by a second offset distance; and
the second beveled pinion gear utilizes hypoid gear geometry.

10. The hybrid electric vehicle axle of claim 9 wherein the first offset distance is equal to the second offset distance.

11. The hybrid electric vehicle axle of claim 10 wherein the hypoid gear geometry of the first pinion and the hypoid gear geometry of the second pinion are substantially the same.

12. A hybrid electric vehicle comprising:
a differential including a ring gear;
first and second pinion gears each in engagement with the ring gear and supported for rotation about axes perpendicular to a ring gear axis;
a first transmission configured to transmit power from an engine to the first pinion gear at multiple speed ratios; and
a second transmission configured to transmit power from an electric motor to the second pinion gear at two speed ratios.

13. The hybrid electric vehicle of claim 12 wherein the axis of rotation of the first pinion gear is not collinear with the axis of rotation of the second pinion gear.

14. The hybrid electric vehicle of claim 12 wherein the second transmission comprises:
a motor shaft fixedly coupled to a rotor of the electric motor;
first and second layshaft gears coupled to motor shaft;
a layshaft fixedly coupled to the second pinion gear; and
third and fourth layshaft gears coupled to the layshaft, the third layshaft gear in continuous meshing engagement with the first layshaft gear and the fourth layshaft gear in continuous meshing engagement with the second layshaft gear.

15. The hybrid electric vehicle of claim 14 wherein:
the first and second layshaft gears are alternately selectively coupled to the motor shaft by a coupler; and
the third and fourth layshaft gears are fixedly coupled to the layshaft.

16. The hybrid electric vehicle of claim 12 wherein the second transmission comprises:
a motor shaft fixedly coupled to a rotor of the electric motor;
gearing establishing a fixed linear speed relationship among the motor shaft, the second pinion gear, a first rotating element, and a second rotating element; and
a braking element configured to alternately selectively hold the first rotating element and the second rotating element against rotation.

17. A vehicle axle comprising:
a beveled ring gear supported for rotation about an axle axis;
first and second beveled pinion gears each in engagement with the ring gear and supported for rotation about axes perpendicular to the axle axis, the first pinion gear adapted to receive power from an internal combustion powertrain;
and
a two speed gearbox configured to transmit power from an electric motor to the second pinion gear.

18. The vehicle axle of claim 17 wherein:
the first beveled pinion gear is supported for rotation about a first pinion axis offset from a ring gear axis by a first offset distance; and
the second beveled pinion gear is supported for rotation about a second pinion axis offset from the ring gear axis by a second offset distance.

19. The vehicle axle of claim 18 wherein:
the first offset distance is equal to the second offset distance; and
the first beveled pinion gear and the second beveled pinion gear have substantially identical hypoid gear geometry.

* * * * *